April 5, 1938. J. W. FITZ GERALD Re. 20,686

ENGINE STARTER

Original Filed May 24, 1937 2 Sheets-Sheet 1

Inventor
John W. FitzGerald
By Dewitt & Jones
Attorneys

April 5, 1938. J. W. FITZ GERALD Re. 20,686

ENGINE STARTER

Original Filed May 24, 1937 2 Sheets-Sheet 2

Inventor
John W. FitzGerald
By Dwight Hilton Jones
Attorney

Reissued Apr. 5, 1938 Re. 20,686

UNITED STATES PATENT OFFICE 20,686

ENGINE STARTER

John W. Fitz Gerald, Milwaukee, Wis., assignor to Briggs & Stratton Corporation, Milwaukee, Wis., a corporation of Delaware Original No. 2,098,866, dated November 9, 1937, Serial No. 144,347, May 24, 1937. Application for reissue February 8, 1938, Serial No. 189,450

23 Claims. (Cl. 74—7)

This invention relates to improvements in engine starters, and refers particularly to starters for automobile engines.

Like the copending application of John W. Fitz Gerald, Serial No. 142,787, filed May 15th, 1937, this invention has as its major object to provide an improved construction for engine starters which entirely eliminates the use of springs and at the same time has all of the required flexibility and resiliency.

It is a special object of this invention to insure greater quietness and smoothness of operation than has been possible with starter constructions heretofore in use.

Another object of this invention resides in the provision of an engine starter wherein both endwise and torsional yieldability are attained by transmitting the driving torque through a cushioning member of rubber.

Another object of this invention is to provide an engine starter of the character described with a non-positive substantially self-energizing driving connection between the driven shaft and the pinion.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which.

Figure 1:
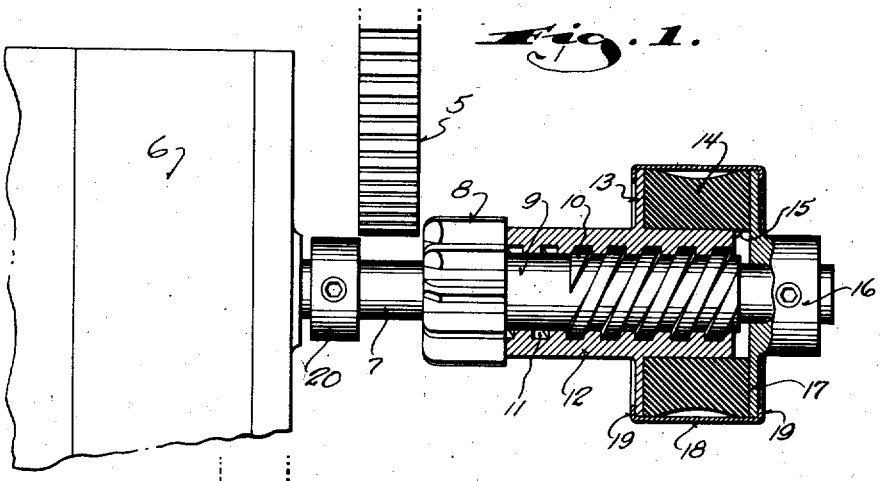
Figure 1 is a view partly in side elevation and partly in longitudinal section, of an engine starter constructed in accordance with this invention.

Referring now particularly to the accompanying drawings in which like numerals indicate like parts throughout the several views, the numeral 5 designates the ring gear of an engine to be started, and the numeral 6 represents the starting motor. The motor 6 has its shaft 7 extended past the ring gear to mount a pinion 8, which is automatically moved into mesh with the ring gear upon initial operation of the starting motor and disengaged therefrom when the engine starts.

The pinion 8 is freely slidably mounted on the shaft 7 and has a sleeve 9 extended longitudinally therefrom. The outer end portion of the sleeve 9 is provided with threads 10 which engage the threads 11 of a nut member 12.

Medially of its ends, the nut member carries a flange or disc 13 against which one face of a rubber block 14 abuts. The rubber block is in the form of a ring and its bore 15 is of a size to fit the diameter of the nut member. Its thickness is greater than the length of the end portion of the nut member upon which it is mounted so as to normally extend beyond the end of the nut member.

At its outer end, the shaft 7 has a collar 16 fixed thereto which is provided with an annular flange 17 similar to the flange or disc 13 and arranged to abut the adjacent end face of the rubber cushion ring.

Engaged over the rubber ring 14 and the flanges 13 and 17 is a shell or cover ring 18, the edges of which are flanged inwardly as at 19 to engage over the flanges 13 and 17 and hold the same against separation.

The space between the inturned flanges 19 is such that the rubber ring 14 is slightly compressed to establish a frictional driving connection between the shaft carried collar 16 and the nut member sufficiently strong to cause the nut member to rotate with the shaft during the initial period of operation of the motor 6. This rotation of the nut member acting through its threaded connection with the pinion 8 and by virtue of the inertia of the pinion 8 propels the pinion forwardly toward the ring gear 5.

Figure 2:
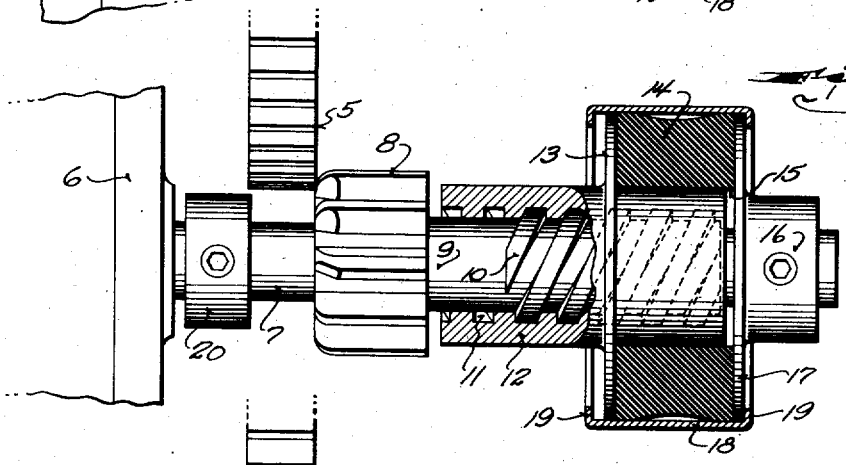
Figure 2 is a view similar to Figure 1, but showing the manner in which endwise yieldability is obtained.

If the forward advance of the pinion is interrupted by an end to end engagement of its teeth with the teeth of the ring gear, as shown in Figure 2, the rubber ring is compressed slightly by reason of the fact that the nut member continuing to turn climbs out on the threads 10 of the pinion which is momentarily held against rotation. The shock of improper engagement is thus cushioned by the endwise resilience of the rubber ring 14.

This condition of improper engagement, however, is but momentary for it requires merely a slight turn of the pinion to effect proper engagement. The forward propulsion of the pinion thus continues until it abuts a fixed stop collar 20 secured to the shaft 7.

Upon engagement of the pinion with this stop 20, its forward advance necessarily stops and until the load of the engine is picked up and rotation commences, the pinion, and consequently its screw 10, are stationary, but the motor driven shaft 7 continues to revolve carrying with it the nut member 12.

Continued rotation of the nut member 12 with the shaft 7 causes the nut member to climb out on the threads of the screw and thus further compressing the cushion ring 14 and increasing the frictional driving engagement between its flange 13 and one face of the rubber ring, and between the other face of the ring and the flange 17.

Figure 3:
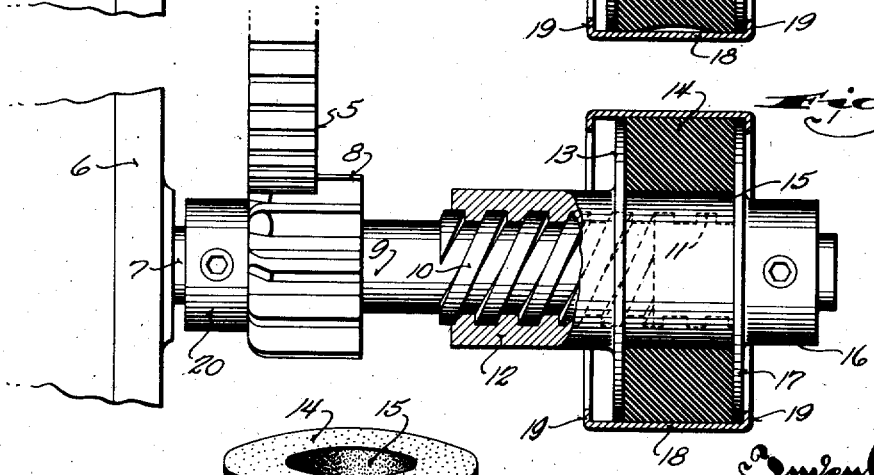
Figure 3 is a view similar to Figure 1, illustrating the manner in which torsional yieldability is obtained.
Figure 4:
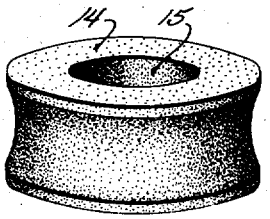
Figure 4 is a perspective view of the rubber cushion member.

Endwise compression of the ring continues until the end of the nut member abuts the face of the flange 17, as shown in Figure 3, whereupon further endwise motion of the nut member is arrested, and if the break-away load of the engine has not been overcome, there being no positive driving connection between the shaft 7 and the nut member, the torsional yieldability of the rubber ring permits a relative twisting or torsional motion between the flange 17 and the flange 13, but without slippage between the faces of the rubber ring and these flanges as the component of friction present at these surface to surface engagements after full compression of the rubber ring is sufficiently high to exceed any normal engine loads.

After a certain amount of this relative twisting which is absorbed by the rubber ring 14, the breakaway load of the engine is overcome and rotation is imparted to the ring gear. In this manner, extreme quietness of operation is insured as there is no sudden positive picking up of the load, and as the engagement of the nut member end with the flange 17 is cushioned by the compression of the rubber ring.

It is to be observed that the shell 18 besides serving as a protecting covering, also holds the flanges 13 and 17 sufficiently close together to maintain the rubber ring 14 under a slight degree of compression to insure an initial driving connection between the two flanges necessary to effect the forward propulsion of the pinion.

Properly constructed, this design is perfectly satisfactory, but to preclude the possibility of having the nut member bind on the threads of the screw, (it being noted that the nut member is not supported except by the screw), which condition might exist if in forming the inturned flanges 19 a slight twist were imparted to the nut member, any one of the constructions shown in Figures 5 to 9, inclusive, may be adopted.

The modified embodiments of the invention, besides precluding the possibility of having the nut member bind on the screw, also do not require as great a compression of the rubber ring, as the driving connection is not dependent solely upon frictional engagement, and consequently, the permitted endwise motion may be reduced which is desirable from the standpoint of quiet operation.

In many respects, the different embodiments of the invention constituting the modifications shown in Figures 5 to 9, inclusive, are identical with that shown in Figures 1 to 4, inclusive, but the initial drive between the shaft and the nut member is obtained differently.

The shell or covering, where it is used, serves principally as a protection against dirt and grease, and otherwise merely holds the flanges between which the rubber ring is confined against too great a separation.

Figure 5:
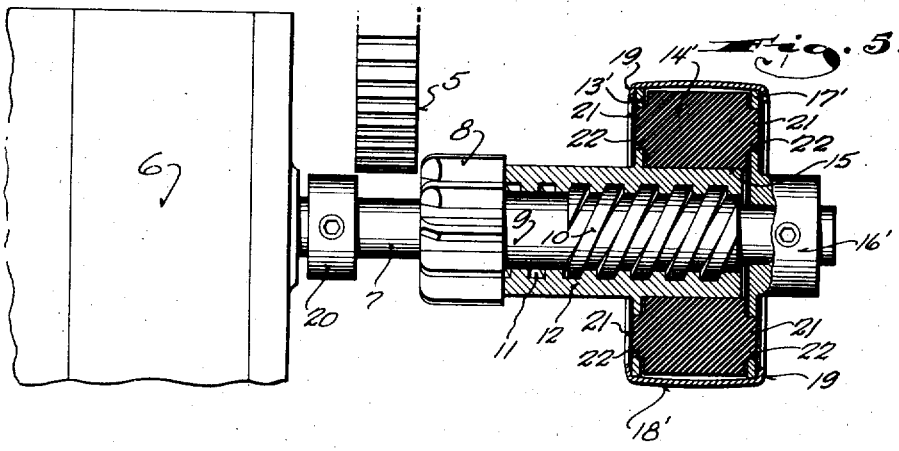
Figure 5 is a view similar to Figure 1, illustrating a slightly modified embodiment of the invention.
Figure 6:
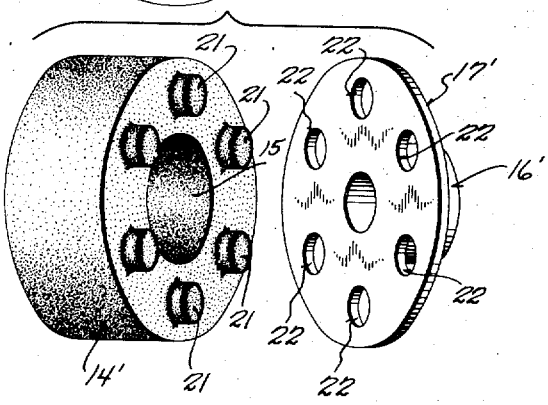
Figure 6 is a perspective view of the rubber cushioning member and one of its associated elements employed in the construction shown in Figure 5.

One manner of obtaining the desired initial driving connection without the initial compression of the rubber ring is through the provision of a plurality of tits 21 projecting from the opposite faces of the cushion ring 14′ and engaging in holes 22 in the flanges 13′ and 17′, as shown in Figures 5 and 6. This interengagement besides insuring rotation of the nut member with the shaft 7 to effect forward propulsion of the pinion during initial operation of the starter, assures an adequate driving connection with little compression of the rubber ring and but a short endwise motion of the nut member, which as stated, is an aid toward quiet operation.

Figure 8:
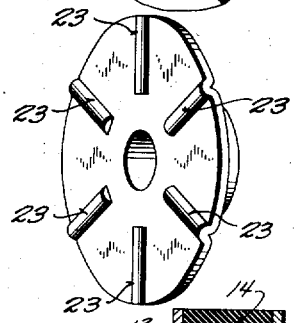
Figure 8 is a perspective view of one end plate or disc which the rubber cushion engages, illustrating another modified construction.
Figure 7:
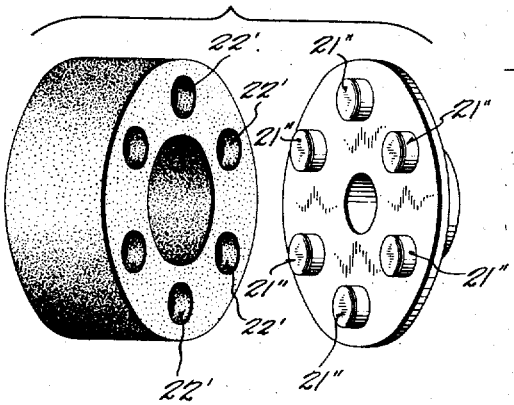
Figure 7 is a view similar to Figure 6, showing another construction for the cushioning member and its associated members.

Obviously, the relationship of the tits and the holes into which they project may be reversed as shown at 21′ and at 22′ in Figure 7, or if desired, the flanges 13′ and 17′ may be provided with radial ridges 23, as shown in Figure 8, to engage in cooperating radial grooves (not shown) in the opposite faces of the rubber ring.

Figure 9:
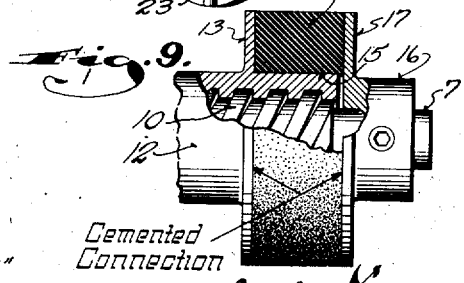
Figure 9 is a view partially in side elevation and partially in longitudinal section, showing another modified embodiment of the invention.

Another very efficient manner of providing for the desired rotation of the nut member during initial operation of the starter and reducing the required endwise motion of the nut member is illustrated in Figure 9. As here shown, the rubber ring is cemented or directly vulcanized to the flanges 13″ and 17″. With this construction, the covering shell may be left off entirely, and if provided merely serves as a protection against dirt and grease.

From the foregoing description taken in connection with the accompanying drawings, it will be readily apparent to those skilled in the art, that this invention provides an engine starter which embodies all of the desired flexibility or resilience without the use of springs, and that the absence of a rigid unyielding driving connection with its permitted relative torsional motion insures the optimum of quietness in operation.

While rubber has been found to be the most satisfactory material to use for the ring or block which serves as the endwise and torsionally resilient driving connection between the motor shaft and the pinion, it can readily be appreciated that any other material having the characteristics of rubber may be employed. The characteristic that must be present is bulk resiliency or cubical elasticity, and it is desirable that the material be nonmetallic. Hence, where the claims recite "an elastically compressible material", it is understood that only rubber or a material having the characteristics of rubber are contemplated and that springs are definitely excluded.

What I claim as my invention is:

1. In an engine starter: a motor driven shaft;

a pinion and a driving connection between the pinion and the shaft by which the pinion is propelled forwardly upon initial rotation of the shaft and rotation is transmitted from the shaft to the pinion, said driving connection including two cooperating spaced members, one of which is fixed to the shaft and the other having a threaded connection with the pinion, but said members having no connection with each other; and an elastically compressible block disposed between said members and arranged to impart an endwise and torsionally yieldable driving connection between said members entirely through frictional engagement of said members with the opposite ends of said elastically compressible block.

2. In an engine starter: a motor driven shaft; a pinion; cooperating elements having a threaded connection for effecting endwise motion of the pinion upon initial rotation of the shaft, one of said elements being fixed with respect to the pinion and the other being free with respect to the shaft; a member fixed to the shaft in spaced relation to said last named element; and a nonmetallic elastically compressible coupling element securely held to said last named element and the member fixed to the shaft to constitute an endwise and torsionally resilient driving connection between the shaft and the pinion, said coupling element being under compression at all times.

3. In an engine starter of the character described including: a motor driven shaft and a pinion; means for drivingly connecting the pinion with the shaft including, two spaced cooperating members, one of which is fixed to the shaft and the other connected with the pinion, said connection including threaded portions; and means for transmitting driving torque at all times from the first to the second member comprising, a rubber block compressed between said cooperating members and transmitting driving torque from the first member to the rubber block and from the rubber block to the second member solely through frictional engagement between said members and the rubber block.

4. In an engine starter: a power driven shaft; a pinion; an operative connection between the pinion and the shaft whereby endwise motion and rotation is imparted to the pinion upon rotation of the shaft, said connection including a member having a connection with the pinion and free from the shaft, said connection including threaded portions; another member fixed to the shaft; a solid body of elastically compressible material having a high coefficient of friction disposed between said members; and means for holding said members against spreading with the body of elastically compressible material in compression therebetween so that said body provides a continuous driving connection between said members, said last named means imposing no restriction upon said members to movement together and rotarily with respect to each other so that said driving connection has a degree of endwise and torsional resilience.

5. In an engine starter: a power driven shaft; a pinion; a member having a connection with the pinion, said connection including threaded portions; another member fixed to the shaft; and a mass of nonmetallic resilient material having a high coefficient of friction interposed between said members and adapted through frictional engagement to transmit driving force from one to the other, said mass constituting the sole driving connection between said members so that said members have a degree of relative endwise and torsional movement.

6. In an engine starter: a power driven shaft; a pinion freely slidable and rotatable thereon; a member having a connection with the pinion, said connection including threaded portions; another member fixed to the shaft; a member of solid compressible material having a high coefficient of friction interposed between said members and adapted through frictional engagement to transmit driving force from one to the other while enabling relative endwise and torsional motion between said members; and means for limiting endwise motion of said members toward each other after a predetermined compression of said solid member.

7. An engine starter of the character described comprising: a power driven shaft; a pinion; a member connected with the pinion, said connection including threaded portions through a screw threaded connection so pitched that rotation of said member with the shaft and relative to the pinion effects an endwise forward propulsion of the pinion, said member having a surface forming an abutment; another member fixed to the shaft having a surface providing another abutment opposite the first named abutment; a member having cubical elasticity compressible between said abutments and constituting the sole driving connection between the shaft and said member having the screw threaded connection with the pinion; and means holding the abutments together to maintain said member in compression.

8. In an engine starter for transmitting starting torque to the ring gear of an engine: a power driven shaft opposite the periphery of the ring gear; a pinion freely rotatable on the shaft and slidable endwise thereon into mesh with the ring gear; a member having a connection with the pinion but entirely free from the shaft, said connection including threaded portions the threads of which are so pitched that rotation of said member in the direction of the shaft rotation and relative to the pinion effects forward propulsion of the pinion toward the ring gear; a driving connection between the shaft and said member comprising, a rubber member adapted to be compressed to provide a secure frictional connection between said member and the rubber member and between the shaft and said rubber member; and means for maintaining the rubber member compressed, said means imposing no restraint upon the rubber member to twisting or compressing further, and said rubber member constituting the sole driving connection between the shaft and the member having the threaded connection with the pinion so that shock incidental to misalignment of the pinion and ring gear and to the break-away load of the engine is resiliently absorbed by the rubber member.

9. An engine starter comprising: a motor driven shaft; a pinion freely slidable and rotatable on the shaft; a threaded sleeve extending from the pinion; a nut member threaded on said sleeve; a flange carried by the nut member medially of its ends; a flange fixed to the shaft; and a rubber ring fitted on the end portion of the nut member between its flange and the shaft carried flange to provide a driving connection between the shaft and the nut member, the thickness of said rubber ring being greater than the length of said end portion of the nut member to normally space the same from the shaft carried flange; and means for holding said flanges against spreading with the rubber ring compressed therebetween to at all times provide a driving connection between the flanges, said last named means imposing no restraint upon twisting or further compression of the rubber ring, and the rubber ring constituting the sole driving connection between the flanges so that endwise motion of the nut member toward the shaft carried flange, and relative circumferential motion of said nut member and shaft is permitted.

10. In an engine starter: a motor driven shaft; a pinion freely slidable and rotatable on the shaft; a threaded sleeve connected with the pinion; a nut member mounted on the threaded sleeve; an annular flange carried by the nut member medially of its ends; a flange fixed to the shaft outwardly from one end of the nut member; a rubber ring encircling the end portion of the nut member between its flange and the shaft carried flange and adapted to be compressed therebetween to provide a non-positive endwise and torsionally resilient driving connection between the shaft and nut member through frictional engagement between the opposite ends of the rubber ring and said flanges; and means for insuring the transmission of driving torque from the shaft to the nut member during the period of initial operation of the starter.

11. In an engine starter: a motor driven shaft; a pinion freely slidable and rotatable thereon; a threaded sleeve carried by the pinion; a nut member threaded on the sleeve and having an annular flange intermediate its ends; another flange fixed to the shaft; a rubber ring encircling one end portion of the nut member and disposed between said flanges, said rubber ring having a normal thickness greater than the length of the nut member end portion which it encircles so as to space the adjacent end of the nut member from the shaft carried flange, said screw threaded connection between the nut member and the pinion carried sleeve effecting forward propulsion of the pinion upon rotation of the nut member with the shaft and relative to the pinion and also causing the nut member to move toward the shaft carried flange upon any obstruction to the forward propulsion of the pinion so as to compress the rubber ring between the flanges and effect a secure driving connection between the shaft and nut member having a degree of endwise resiliency defined by the space between the shaft carried flange and the adjacent end of the nut member and having torsional resiliency to allow relative rotation between the nut member and shaft; and means to insure rotation of the nut member with the shaft during the initial period of operation of the starter.

12. In an engine starter: a power source; a pinion automatically engageable with an engine part; and a non-positive self-energizing driving connection between the power source and the pinion comprising, two abutments, one of which is connected with the power source, and the other with the pinion; and a yieldable rubber cushion compressible between the abutments as the load of the engine is picked up to form an endwise and torsionally yieldable driving connection between said abutments which constitutes the sole driving connection between the power source and the pinion.

13. In an engine starter: a motor driven shaft; a pinion free with respect to the shaft; a member having a connection with the pinion, said connection including threaded portions; another member fixed to the shaft, said members being spaced endwise along the shaft; a rubber ring encircling the shaft between said members with its opposite ends engaging the members; and means holding said members to clamp the rubber ring therebetween so that the rubber ring provides the sole driving connection therebetween.

14. In an engine starter: a motor driven shaft; a pinion free with respect to the shaft; a member having a connection with the pinion, said connection including threaded portions; another member fixed to the shaft, said members being spaced endwise along the shaft; a rubber ring encircling the shaft between said members with its opposite ends frictionally engaging the members and forming the sole driving connection therebetween; and means for limiting movement apart of said members to maintain the rubber ring under compression.

15. In an engine starter: a motor driven shaft; a pinion free with respect to the shaft; a member having a connection with the pinion, said connection including threaded portions; another member fixed to the shaft, said members being spaced endwise along the shaft; a rubber ring encircling the shaft between said members; interengaging means on the opposite ends of the rubber ring and said members; and a cover disposed over the rubber ring and said members and engaging the members to limit their relative movement apart and preclude detachment of the interengaging connections between the rubber ring and said members.

16. In an engine starter: a motor driven shaft; a pinion loose on the shaft; a member also loose on the shaft and means connecting said member with the pinion so that relative rotation between the pinion and said member causes relative endwise motion therebetween; another member fixed on the shaft and spaced endwise from said first named member; a rubber ring encircling the shaft between said members with its ends engaging the same to provide the sole driving connection between the members, said rubber ring being compressible endwise between the members upon endwise motion of the first named member caused by restraint of motion on the part of the pinion; and means for limiting the compression of the rubber ring so that relative rotation between the shaft and pinion thereafter is absorbed by a torsional yielding of the rubber ring.

17. In an engine starter: a motor driven shaft; a pinion free with respect to the shaft; a member having a connection with the pinion, said connection including threaded portions; another member fixed to the shaft, said members being endwise spaced along the shaft; a ring of elastically compressible material encircling the shaft between said members with its opposite ends engaging the members to provide the sole driving connection therebetwen; and a cylindrical shell enclosing the ring and joined to said members to hold the same together with the ring compressed therebetween, said cylindrical shell imposing no restraint upon further compression or twisting of the ring.

18. In an engine starter: a motor driven shaft; a pinion free with respect to the shaft; a member having a connection with the pinion, said connection including threaded portions; another member fixed to the shaft, said members being spaced endwise along the shaft; a ring of elastically compressible material encircling the shaft between said members to drivingly connect the same; a cylindrical shell enclosing the ring; flanges on the opposite ends of the shell engaging said spaced members to hold the same together with said ring compressed therebetween, said shell imposing no restraint upon further compression or twisting of the ring, and said ring being so shaped as to leave a space between it and an adjacent confining wall into which space the elastically compressible material flows upon further compression thereof.

19. In an engine starter: a motor driven shaft; a pinion free with respect to the shaft; a member having a connection with the pinion, said connection including threaded portions; another member fixed to the shaft, said members being spaced endwise along the shaft; a ring of elastically compressible material encircling the shaft between said members to drivingly connect the same; a cylindrical shell enclosing the ring; flanges on the opposite ends of the shell engaging said spaced members to hold the same together with said ring compressed therebetween, said shell imposing no restraint upon further compression or twisting of the ring, and said ring being formed with an annular groove on its outside to provide a space between it and the shell into which the material of the ring flows upon further compression thereof.

20. In an engine starter: a motor driven shaft; a pinion free with respect to the shaft; a member having a connection with the pinion, said connection including threaded portions; another member fixed to the shaft, said members being spaced endwise along the shaft and having surfaces providing opposed abutments; a ring of elastically compressible material encircling the shaft between the abutments with the opposite ends thereof engaging the same to provide the sole driving connection between said members; and a cylindrical shell enclosing the ring and joined to said members to hold the same together with the ring of elastically compressible material compressed between their abutments, said ring having its end faces substantially coextensive in size with the abutments and being so shaped in cross section as to leave a space into which its mass may flow upon further compression of the ring.

21. In an engine starter: a motor driven shaft; a pinion free with respect to the shaft; a member having a connection with the pinion, said connection including threaded portions; another member fixed to the shaft, said members being spaced endwise along the shaft; annular flanges of substantially the same diameter on said members; a ring of elastically compressible material encircling the shaft between said members with the opposite ends thereof engaging the flanges to provide the sole driving connection between said members; a cylindrical shell engaged over the ring and said flanges; and inwardly directed marginal edge portions on the ends of the shell engaged over said flanges to hold the same together with said ring compressed therebetween.

22. In an engine starter: a motor driven shaft; a pinion free with respect to the shaft; a member having a connection with the pinion, said connection including threaded portions; another member fixed to the shaft, said members being spaced endwise along the shaft; a bushing on one of said members projecting toward the other and engageable therewith to limit movement of said members toward each other, said members having opposed surfaces; a ring of elastically compressible material encircling the bushing and having its ends engaged with said surfaces to provide the sole driving connection between said members; and an outer shell over the ring and joined to said members to hold the same together with the ring of elastically compressible material compressed to an extent at which the end of the bushing is still spaced a distance from the other member.

23. In an engine starter: a motor driven shaft; a pinion free with respect to the shaft; a member having a connection with the pinion, said connection including threaded portions; another member fixed to the shaft, said members being spaced endwise along the shaft; a bushing on one of said members projecting toward the other and engageable therewith to limit movement of said members toward each other, said members having opposed surfaces; a ring of elastically compressible material encircling the bushing and having its ends engaged with said surfaces to provide the sole driving connection between said members; and an outer shell over the ring and joined to said members to hold the same together with the ring of elastically compressible material compressed to an extent at which the end of the bushing is still spaced a distance from the other member; the outer cylindrical surface of the bushing and the inner cylindrical surface of the shell forming cylindrical walls and cooperating with said opposed surfaces to define an enclosure for the ring, and said ring being so shaped in cross section as to provide a space between it and one of the cylindrical confining walls for the reception of the displaced mass incidental to further compression of the ring.

JOHN W. FITZ GERALD.